United States Patent  (10) Patent No.: US 11,021,001 B2
Geday et al.  (45) Date of Patent: Jun. 1, 2021

(54) OPTICAL DEVICE AND METHOD FOR ACHIEVING MULTIPLE LATENT IMAGES FOR DOCUMENT SECURITY

(71) Applicants: UNIVERSIDAD POLITECNICA DE MADRID, Madrid (ES); ALISE DEVICES, S.L., Villanueva de la Cañada (ES)

(72) Inventors: Morten Andreas Geday, Madrid (ES); Patxi Xabier Quintana Arregui, Madrid (ES); Jose Manuel Otón Sánchez, Madrid (ES); Beatriz Cerrolaza Martínez, Madrid (ES); Carlos Carrasco Vela, Madrid (ES)

(73) Assignees: UNIVERSIDAD POLITECNICA DE MADRID, Madrid (ES); ALISE DEVICES, S.L., Villanueva de la Cañada (ES)

( * ) Notice: Subject to any disclaimer, the term of this patent is extended or adjusted under 35 U.S.C. 154(b) by 394 days.

(21) Appl. No.: 15/766,767

(22) PCT Filed: Oct. 8, 2015

(86) PCT No.: PCT/ES2015/070731
§ 371 (c)(1),
(2) Date: Apr. 6, 2018

(87) PCT Pub. No.: WO2017/060544
PCT Pub. Date: Apr. 13, 2017

(65) Prior Publication Data
US 2018/0290479 A1 Oct. 11, 2018

(51) Int. Cl.
*B42D 25/364* (2014.01)
*G02B 5/30* (2006.01)
(Continued)

(52) U.S. Cl.
CPC ............ *B42D 25/364* (2014.10); *G02B 5/30* (2013.01); *G02F 1/1334* (2013.01);
(Continued)

(58) Field of Classification Search
None
See application file for complete search history.

(56) References Cited

U.S. PATENT DOCUMENTS 6,391,528 B1   5/2002  Moshrefzadeh et al.
2004/0057113 A1 3/2004  Tompkin
(Continued)

FOREIGN PATENT DOCUMENTS

EP   1486803 A2   12/2004
EP   2259102 A1   8/2010
(Continued)

OTHER PUBLICATIONS

Myhre et al. "Patterned Color Liquid Crystal Polymer Polarizers" Optics Express, vol. 18, No. 26, Dec. 20, 2010 in 10 pages.
(Continued)

*Primary Examiner* — Derek S. Chapel
(74) *Attorney, Agent, or Firm* — Knobbe, Martens, Olson & Bear, LLP (57) ABSTRACT

The present invention is related to a manufacturing method of an optical feature for documental security which includes multiple latent images whose visualization depend on the mode the feature is observed. The method comprises the steps of defining the different regions present on the inner surface of a first confinement structure; inducing different alignment directions on the defined regions; defining a second alignment structure wherein the second structure is a polarizer with multiple patterns; placing the liquid crystal between the first and the second structures, and polymeriz-
(Continued)

ing the liquid crystal, forming a sheet. The images are visible by means of a polarized light source or a polarizing sheet.

12 Claims, 4 Drawing Sheets (51) Int. Cl.
G02F 1/1334 (2006.01)
G02F 1/1335 (2006.01)
G02F 1/1337 (2006.01)
G07D 7/12 (2016.01)
G07D 7/00 (2016.01)

(52) U.S. Cl.
CPC ...... *G02F 1/1337* (2013.01); *G02F 1/133528* (2013.01); *G07D 7/003* (2017.05); *G07D 7/12* (2013.01)

(56) References Cited

U.S. PATENT DOCUMENTS

| | | | |
|---|---|---|---|
| 2008/0280107 A1 | 11/2008 | Katschorek et al. | |
| 2009/0310195 A1* | 12/2009 | Suzuki | B42D 25/355 359/2 |
| 2010/0141881 A1* | 6/2010 | Batistatos | B42D 25/29 349/124 |
| 2012/0300156 A1 | 11/2012 | Quintana Arregui et al. | |
| 2014/0002780 A1* | 1/2014 | Schadt | G02B 27/281 349/117 |
| 2014/0042738 A1 | 2/2014 | Power et al. | |

FOREIGN PATENT DOCUMENTS

| | | |
|---|---|---|
| EP | 2508358 A1 | 10/2012 |
| EP | 2543521 A1 | 1/2013 |
| ES | 2337010 A1 | 4/2010 |
| WO | 98/052077 A1 | 11/1998 |
| WO | 02/077588 A2 | 10/2002 |
| WO | 2007/137334 A1 | 12/2007 |
| WO | 2011/017749 A1 | 2/2011 |

OTHER PUBLICATIONS

International Search Report for International Application No. PCT/ES2015/070731, dated Jul. 4, 2016 in 4 pages.
Yamaguchi et al., "Polarized Latent Image Forming in Liquid Crystal Devices Using Polymer Surface Photo-Moditication Technique," Integrated Optical Devices, Nanostructures, and Displays, Proceedings of SPIE vol. 5618; pp. 166-173, 2004.

* cited by examiner

OPTICAL DEVICE AND METHOD FOR ACHIEVING MULTIPLE LATENT IMAGES FOR DOCUMENT SECURITY

CROSS-REFERENCE TO RELATED APPLICATIONS

This application is the U.S. National Phase under 35. U.S.C. § 371 of International Application PCT/ES2015/070731, filed Oct. 8, 2015. The disclosures of the above-described application are hereby incorporated by reference in their entirety.

TECHNICAL FIELD OF THE INVENTION

The present invention is applicable in the field of document security and more specifically it is referred to the security features provided with optical devices that facilitates the identification of original documents. For example, by means of the incorporation of a sheet containing multiple latent images with gray scale or colored thanks to the properties of liquid crystals and the polarization of light.

BACKGROUND OF THE INVENTION

Nowadays, new security techniques based on variable iridescent and non-iridescent optical devices are being developed. Liquid crystals properties like anisotropy, optical birefringence or the phase transitions of the liquid crystal (LC) itself are especially useful for security features purpose. When these properties are adequately handled it is possible to create several different optical effects easily verifiable with the naked eye or by means of the use of simple optical elements.

The state of the art discloses several different solutions for document security and authentication. Some of them use polarizers with multiple orientations divided into several zones while some others use liquid crystal aligned with the same patterns. These devices can show one or more different images depending on the inspection mode of the feature.

Patterned polarizers (from now "PP") contain several areas with different polarization axis orientations. All these orientations are parallel to the polarizer sheet plane creating a motif or a pattern which can eventually produce an image.

PP sheets can be constructed in various ways according to multiple documents in the state of the art. For example, Myhre et al. (*Optics Express* (2010) Vol. 18, No 26 pp. 27777-27786) which discloses the manufacturing of a linear PP using photo alignment, dichroic dyes and polymer liquid crystals (PLC). The US patent U.S. Pat. No. 6,391,528 B1 describes a method to create optical elements with metallic grids by depositing the material on a substrate. A pattern of electromagnetic interference is created onto the substrate. This pattern heats up selectively certain areas of the substrate. Then the substrate is exposed to the gas phased material that is aimed to be deposited. The material will tend to accumulate preferentially in specific regions of the surface according to the temperature.

The international patent application WO02/077588-A2 describes a pattern wire grid polarizer with multiple orientations. The device comprises a certain number of elongated parallel elements whose size is adequate to interact with visible light. The orientation of these elongated elements varies between the zones of the device. The size and separation of the elements are chosen so that one polarization of light is transmitted while the other polarization is reflected.

Patent US 20040057113 A1 describes a security device including the so-called "zero order microstructure" that is very selective in flection for specific light directions while producing at the same time a strong polarization effect on both the transmitted and reflected light beams.

Patent EP 1 486 803 A2 describes how to create a surface relief structure having both diffractive and polarizing properties whose characteristics vary from one region to another. The resulting device is based on the birefringence of structures whose period is significantly smaller than the wavelength of light incident on the grating. It generates different images when it is observed in reflection and in transmission under polarized light. Patent US 2014042738 A1 describes a similar structure which includes metallic layers creating a very similar effect.

Patent US 20080280107 A1 describes how holographic structures (anisotropic polymeric layers) can selectively reflect polarized light and how they can align liquid crystals in multiple directions. Moreover, it describes how to design a structure to vary the thickness of the liquid crystal sheet. When this device is built together with a polarizer it can create latent images that are visible when it is examined through a circular or a linear polarizer.

A common characteristic of all these PP is that the images are just visible when they are observed under polarized light, but only one motif or image and its negative will be visible either in transmission or in reflection mode. The degree of visualization of the primary image and its complementary image will depend on the orientation of the polarization plane of the incident light, either on the orientation of the polarization plane of the analyzer (polarizer without embedded pattern) when observing the device under natural light.

There are some existing technologies that allow visualizing different images on both sides of a single device when it is illuminated in transmissive mode. For example, ES2337010 A1, EP2508358 A1 and US2012/0300156, which show a simple transmissive sheet made with polymerized liquid crystal, which is applied in document security. Polymerized liquid crystal sheets show one or several images on each side when the sheet is illuminated with polarized light, while they appear as crystal clear transparent colored sheets without any image when they are illuminated with natural light. Doping the polymerizable liquid crystal monomer with dichroic dyes, which follow the orientation of the liquid crystal molecules, the images are generated. The two independent patterns appearing on the opposite surfaces of the film are generated by selectively aligning the liquid crystal doped with the dichroic dye during the polymerization process. Images can be black/white (B/W), monochrome or multicolor images, including gray scale and high resolution.

Patent WO 98/52077 obtains a similar effect by including a uniformly oriented linear polarizer between two patterned liquid crystal retarder layers. Patent WO 98/52077 presents devices based on photo-oriented polymer network (PPN) layers deposited on a substrate and selectively oriented in several directions varying in different positions of the surface. At the same time, the PPN layer is covered by other layer made of polymeric liquid crystal. This second layer is optically anisotropic and birefringent, and it acts as an optical retarder. The liquid crystal of the retarder layer spontaneously follows the selective orientation dictated by the PPN layer which allows to obtain the images by phase delay. Images are visible with the aid of a polarizer. Although it presents a complex structure that needs three layers, two of them are linear retarders created from polymeric liquid crystal and the third is a linear polarizer. The international application WO 2007/137334 A1 presents similar structures that can potentially show independent images. Multi-layered liquid crystal retarder sheets, which are selectively oriented, are used. However, it pays less attention to PPN layers than WO 98/52077 while emphasizes the chemical composition of the cross-linked components of the polymeric liquid crystal.

In terms of liquid crystal alignment, the state of art also offers multiple techniques, but they use to be complex techniques which require high precision and instruction.

GENERAL DESCRIPTION

The present invention is based on a combination of techniques previously referenced in the state of art. It presents an evolution on optical elements by disclosing a manufacturing method of polarizing sheets with multiple orientation patterns which contain at least two different images (and their complementary negative images).

Images shown depend on the polarization direction of the incident light; it also depends on the fact that it is working in transmission or in reflection mode; and it depends on the side of the device that is oriented to the polarizer or polarized light source. Gray scale and color images are obtained in one single polymer liquid crystal sheet without the need to dope it with dichroic dyes.

One first aspect of the invention refers to a method to produce optical elements for documental security with multiple latent images. This method comprises the following steps:
  a) defining different regions in the inner surface of a first confinement structure;
  b) Inducing different alignment directions in the regions defined in step a);
  c) defining a second alignment structure wherein this second structure is a multiple patterned polarizer;
  d) placing the liquid crystal between the first and second structures;
  e) polymerizing the liquid crystal forming a sheet.

The polarizer of the second structure can align the liquid crystal by itself. Alternatively, one of the embodiments of the invention contemplates defining different regions in the inner surface of the second alignment structure to induce different alignment directions in the different regions defined. Optionally, according to one of the embodiments of the invention, the alignment directions induced can be set to create a unidirectional common alignment on the inner surface of the polarizer with multiple patterns to align the liquid crystal placed between the structures. Optionally, according to one of the embodiments of the invention, the alignment directions induced comprises several selective alignment directions on the inner surface of the polarizer with multiple patterns to align the liquid crystal placed between the structures.

Once the liquid crystal is polymerized, forming a sheet, it is contemplated in one embodiment of the invention to extract the sheet together with the polarizer from the first confinement structure.

It is contemplated in one of the embodiments of the invention that the first confinement structure also comprises one polarizer with multiple patterns.

The definition of the different regions in one or both inner surfaces of the confinement structures can be accomplished selectively by means of one of the following techniques: nm scale printing; selective laser ablation; photolithography; masks; physical barriers; selective deposition; thermal evaporation; inkjet; or a combination thereof.

In terms of the induced alignment direction, according to one of the embodiments of the invention, it is parallel to the confinement structures plane. It follows an independent pattern in each confinement structure using at least one of the following techniques: mechanical rubbing of the alignment layer; oblique deposition of the alignment material; photo alignment of a photosensitive material; creation of micrometric or sub micrometric structures capable of aligning the liquid crystal; use of interdigitated electrodes generated onto the confinement structures; or a combination thereof.

It is contemplated in one of the embodiments of the invention that the alignment directions of at least two regions of the sheet are not linear with respect to one another.

It is contemplated in one of the embodiments of the invention that at least two of the induced alignment directions are orthogonal with respect to one another.

It is contemplated in one of the embodiments of the invention to determine the relative angle between the induced alignment directions to generate different gray levels in the latent images.

In addition, it is possible to add a red, green and blue (RGB) color matrix to the latent images. Moreover, it is contemplated that the color matrix can be placed so that the defined regions in the sheet match the RGB matrix pixels. The RGB matrix can be placed on the outer side of the polymerized sheet or on the outer side of the polarizer. It can also be placed on the inner side of a polymeric protective sheet which covers the optical feature.

There is a second aspect of the invention that refers to an optical feature for document security purpose with multiple latent images, which comprises a polymerized liquid crystal sheet combining twist and homogeneous structures, and a multi patterned polarizer with various regions predefined in at least one removable confinement structure. These predefined regions maintain an orientation according to an alignment pattern. These orientations differ with an angle less or equal than 90° in at least one side of the feature, forming latent images which are visible when illuminating with polarized light.

Additionally, the sheet can include a covering polymeric protective film that helps to protect the optical feature.

According to one of the embodiments of the invention, the alignment directions can have relative orientations of 0°, 45°, 90° and 135° in order to generate two monochrome images without interference with respect to one another.

The confinement structures have been treated to generate a pattern with several regions and orientations defined in the liquid crystal sheet. It is contemplated in one of the embodiments of the invention that these confinement structures are reusable. So, advantageously, once the polymerized sheet and the polarizer are extracted, the confinement structures can be used again to produce another sheet with the same pattern.

Additionally, the optical element of the present invention according to one of its embodiments may comprise a RGB matrix placed between the polymerized sheet and the polymeric protective film, or between the polarizer and the polymeric protective film.

Optionally, it is contemplated in one of the embodiments of the present invention to use mirror images referred to the polarization axis of the polarizer in order to generate overlapped images with gray scale.

DESCRIPTION OF THE DRAWINGS

To complement the description that is being made and for the purpose of aiding to better understand the features of the invention, a set of drawings is attached as an integral part of said description in which the following has been depicted in an illustrative and non-limiting manner.

DETAILED DESCRIPTION OF THE INVENTION

The present invention is referred to an optical feature for document security purpose containing one or several latent images on each side. The images are visible just when they are observed in transmissive mode under linearly polarized light, commonly known as polarized light, or by using an analyzer if the feature is observed under natural light.

The feature or device is made by a polymerized liquid crystal sheet (PLC, also called reactive mesogen) combined with at least one polarizer engraved with a motif or a pattern of regions with different azimuthal orientations, named in this document as polarizer with multiple patterns or PP. This polarizer can have reflective nature when reflecting one polarization of light and transmits the perpendicular one; or it can have absorbing nature when eliminating one polarization of light by absorption and permitting the perpendicular one to pass through.

By creating two features, the PLC sheet and the PP, divided in regions or pixels with different orientations, it is possible to generate an image of arbitrary complexity. The only requirement is a strict restriction of the alignments between the PP and the PLC sheet.

The operating principle of the device is based on two basic physical properties of the two elements comprising it. The PP generates selective attenuations of polarized incident light in the regions with different long axis. The attenuation could become complete (depending on the quality of the polarizer) or zero (with Fresnel's dielectric reflection loses). On the other hand, the primary function of the PLC sheet is to modify the polarization state of the light: in its simplest operation the linearly polarized light coming from the source (or from the PP) makes a greater or lesser rotation of the plane of polarization when it passes through the PLC sheet. However, the polarization is maintained linear and no beam attenuation occurs.

There are two fundamental liquid crystal structures which are able to rotate the polarization plane of the lineal incident light maintaining the beam linearly polarized: the variable helix twist structure and the homogeneous structure (parallel to the confinement plates) with an optical delay of half wave (HWP). Both structures can be produced using polymerizable liquid crystals to create PLC sheets. Both structures have intrinsic gray scales and both allow to generate colors, under special configurations that will be disclosed later on, without the need of filters.

This kind of device shows different images depending on the side from which the inspection is carried out:

If the incident light impinges on the side where the PP is placed, according to Malu's law, it will be more or less transmitted depending on the angle between the plane of polarization of the incident light and the long axis of the polarizer in each region. The light that passes through the polarizer is transmitted without attenuation through the PLC sheet. Naked human eye is not able to distinguish polarizations so the image observed is basically the image generated by the PP.

If the incident light impinges on the side where the PLC sheet is placed, it will be transmitted without attenuation and maintaining the linear state of polarization. However, the outgoing polarization of light can be twisted with respect to the incident light depending on the twist or HWP structures present in each region. The outgoing light from the PLC modified with respect to the incident light passes through the PP and it is attenuated more or less, according to Malu's law, depending on the angle between the plane of polarization of the incident light and the long axis of the polarizer in each region. In this case, the image observed is generated by the joint action of the PLC sheet and the PP.

The device's design contemplates any possible combination of polarization patterns' orientations in the PP and in the azimuthal twist angle of the PLC sheet (or the HWP orientation in its case). Therefore, the images observed from both sides are totally independent.

The maximum variation of the transmitted light intensity would depend basically on the quality of the polarizers employed. If the incident light is just partially polarized there will be a partial extinction of the light. In the same way, if the PP is not ideal there will be partial extinction as well. In both cases a low contrast image will be obtained.

The present invention consists of a PP element superimposed to a PLC polymerized liquid crystal sheet which has twist or HWP structures that can rotate in a greater or lesser way the polarization state of the light. So, the optical feature assembled can show several latent images on each side and it can take the advantage that any relative transmission can be achieved by any angle, positive and negative, between the polarized light and the polarizer element. For example, an image with regions aligned at 45° and −45° shows a unique gray level when the impinging polarization is oriented at 0° or 90° while it present maximum difference (contrast) between pixels when the impinging polarization is −45° or +45°.

More specifically, in one of the embodiments of the invention the PLC sheet acts as a selective polarization rotator twisting the light polarization in specific areas by means of twist structures. In this case, a homogeneous alignment (parallel to the surface) with variable plane directions is induced in the liquid crystal molecules. Later on the liquid crystal is polymerized to set the orientation. The PLC sheet obtained is divided into multiple regions or pixels characterized by specific variations of the azimuthal alignment directions in both sides. It generates a sheet with variable helix twist structures between −90° and 90°, or even greater angles in supertwist configurations. These structures rotate the polarization of light in a greater or lesser way following the helix twist. The structures can incorporate gray scales and false color without the need of external filters, or true color by employing an external matrix of RGB color filters. One alternative embodiment of the invention contemplates that the PLC sheet acts as a half wave retarder sheet (HWP). In this case, a homogeneous alignment (parallel to the surface) with variable plane directions is induced in the liquid crystal molecules. Later on the liquid crystal is polymerized to set the orientation. The PLC sheet obtained is divided into multiple regions or pixels characterized by specific variations of the azimuthal alignment directions in both sides. It generates a sheet with homogeneous structures including orientations varing between −90° and 90°. The resulting sheet has several areas, all of them HWP, which are oriented in different directions. Depending on the existing angle between the HWP orientation and the polarization of the incident light, each region of the PLC sheet will rotate the polarization in a greater or lesser way between −90° and 90°, generating gray scales. In addition, taking advantage of the variable retardation of the different spectrum regions, these structures can generate false color without the need of external filters or true color by using an external matrix of RGB color filters.

The manufacturing method of the present invention uses confinement structures to induce an alignment pattern to the polymerizable liquid crystal. These confinement structures can be a part of the final assembling of the device and they can contain the polarizing feature, or they can be removed and even be reused to create other sheets.

The resulting device shows two or more latent images when it is illuminated with polarized light from each side or when it is observed through an analyzer. In contrast with production of standard liquid crystal displays, the manufacturing method of the present invention starts directly from a polymerizable liquid crystal. Moreover, the glass substrates usually employed are replaced in the present invention by confinement plates. Each confinement plate is imprinted with an alignment pattern on the inner surface having different orientations. The alignment variations are in the plane of the confinement plates which can also include polarizing elements. The confinement plates can be a part of the final structure.

On the other hand, twisted PLC or engraved HWP sheets are achieved in various steps which can be summarized in: first, placing the liquid crystal between the two confinement plates and it will be oriented by the confinement plates with the desired pattern; second, liquid crystal is polymerized to ensure that twist or HWP orientation pattern is permanent; third, and optional, the polymerized liquid crystal sheet is extracted from the sandwich, once the liquid crystal has been polymerized it is a thin sheet containing already the alignment pattern and latent images. The PP will preferably be part of the sheet manufacturing process since its early stages; if it is not, twist or HWP structure and the PP will be joint in a later stage.

The final result obtained from the manufacturing process is an optical feature which consists in a thin device containing a set of images that are visible by employing a polarized light source, partially polarized light or a polarizer. The device can be flexible, as much as the confinement plates permits, since the PLC sheet is completely flexible. The sheet, with its proper covering for each application, can be inserted in a document to guarantee its authenticity.

The device looks like uniform in transmission under natural light, but it can show latent images in reflection depending on the structure of the polarizing elements. When it is illuminated with partially polarized light one set of images appear; the set of images is determined by the side of the device that faces the incident light. A second set of images appear, for example, by rotating slightly the sheet. Other sets of images can be visible by illuminating the device from the other side with partially polarized light. If the alignment patterns of the confinement plates of both sides generate polarization changes on the incident light, the appearance will depend on the side which is oriented to the polarized light source or to the polarizer.

In one embodiment of the invention, the polarizer can be made as a holographic element that is selectively metallized and demetallized in specific regions, producing a polarizing effect. It is also possible to metallize it in other regions to create a final device that contains completely transparent regions, completely opaque regions and partially transparent regions with higher or lower transmitivity.

It is contemplated that one of the embodiments of the present invention could be integrated in a device with opaque (reflective) zones which could be placed around the optical feature as a kind of frame.

Regarding to the orientation of the liquid crystal it can be predetermined by conditioning the inner faces of the confinement plates used to create the PLC sheet.

The orientation of the liquid crystal on the plane of the confinement plates is achieved in two different ways:

by using alignment techniques that are commonly employed in liquid crystal devices manufacturing but defining different regions depending on the desired alignment pattern (rubbing, photoalignment, micrometric grooves, etc.). In standard liquid crystal screens manufacturing, confinement plates are conditioned to obtain the same liquid crystal orientation on the entire surface, or a repetitive pattern; on the other hand, these devices generate various orientations on each surface to create one static image.

by employing interdigitated electrodes which vary their orientation in the plane of the confinement plates. In this case, high electric voltages are required during the manufacturing process but they are not required during the ordinary use of the device. The electrodes are made by photolithographic techniques, micro mechanical techniques, micrometric metallic printing or laser ablation to create a motif. Later on, a liquid crystal layer, whose orientation is controlled by applying voltage to the electrodes, is deposited so that it is reoriented by in plane switching (IPS). In this way it is obtained a multiple alignment pattern that shows the motif determined by the electrodes. Once the alignment is set, the liquid crystal is polymerized "in situ" in order to generate a thin and flexible sheet whose appearance is determined by the electrode pattern. Once it is polymerized, voltage can be removed as the material maintains the orientation defined by the voltage distribution of the electrodes.

In order to create the images, the confinement plates receive several surface treatments depending on the alignment pattern in the regions defined on each of the two surfaces. The regions are separated one form another and different procedures are used according to the different embodiments of the invention: masks, photolithography, physical barriers, selective deposition, thermal evaporation, inkjet, or any other procedure that is commonly employed in microelectronics manufacturing. These treatments promote a homogeneous configuration (also called 'plane configuration' or 'parallel to the confinement plates') of the liquid crystal but with different orientations which determine regions that eventually appear clear or dark when illuminating with polarized light. This generates several images in each side of the resulting PLC sheet when it is combined with a PP, or with polarized light or an analyzer.

If the light impinges on the PP side of the feature, the polarizer automatically generates a gray scale according to the orientation of its long axis. If the light impinges on the PLC sheet, the variation of the alignment directions allows to define a gray scale and even color images:

The gray scale in twist structures can be obtained, for example, by orienting the liquid crystal parallel to the plane of polarization of light in the entrance side. The exit orientation in the other side is variable, forming an angle between −90° and 90° with respect to the entrance orientation which determines the internal rotation of the material and the helix pitch (supertwist configurations can also be used, beyond +/−90°, by adding a quiral dopant to the liquid crystal). This controls the orientation of the outgoing polarization which determines also the intensity of the light transmitted through the PP.

If the liquid crystal orientation in the entrance is tilted with respect to the plane of polarization of light, then it generates orthogonal components of the electromagnetic field propagating with different velocities. This generates phase delays that cause elliptic states of polarization which are partially transmitted in the exit polarizer. This is an undesirable phenomenon in liquid crystal screens but it is useful for the present invention because some regions in the spectrum have better propagation than some others and colors can be generated in the resulting image. These colors can be used to create false color images, like thermal cameras images.

Another method to generate false color in twist structures, which is compatible with PLC sheets, requires a helix pitch according to Mauguin's condition to ensure that the polarization of light rotates in the liquid crystal helix direction, in other words the helix pitch has to be significantly bigger than the light wavelength. When the structure is close to that limit, propagating light stops to be linear and turns into elliptic so it allows the partial transmission in the exit polarizer. As in the previous case, this is an undesirable phenomenon in liquid crystal screens but it is useful for the present invention because some regions in the spectrum have better propagation than some others and colors can be generated in the resulting image. These colors can be used to create false color images, like the thermal cameras images.

The gray scale in HWP structures can be obtained by controlling the relative orientation between the plane of polarization of the incident light and the molecular orientation of the liquid crystal. HWP produce a 90° rotation of the linearly polarized light only in the case that the orientations form an angle of ±45°. Any other bigger or smaller angle generates linear polarizations which are rotated in small angles. This controls the orientation of the outgoing polarization which determines also the intensity of the light transmitted through the PP.

A birefringent sheet like the PLC sheet, which is designed as a half wave retarder, it can only introduce an accurate half wave phase delay of (Tr radians) at a determined wavelength. Short wavelengths have bigger delays and long wavelengths have smaller delays. In consequence, the polarization of these waves stop to be linear and creating colors in the resulting image. These colors can be used to create false color images, like the thermal cameras images. It is possible to select the color range partially by modifying the thickness of the structure or its birefringence.

The color effect is enhanced when the HWP is not in the first order, so that it does not introduce half wave phase delay but an integer multiple of plus half a wavelength.

Finally, the liquid crystal polymerization makes it possible that the sheet can be extracted from the confinement plates and it can be used for multiple applications by itself or combined with a PP layer which has latent images already defined. Therefore, the confinement plates can optionally be a part of the final structure, improving, for example, its stiffness or the device endurance. They can also be removed to achieve thinner and lightweight devices, and completely flexible.

Figure 1:
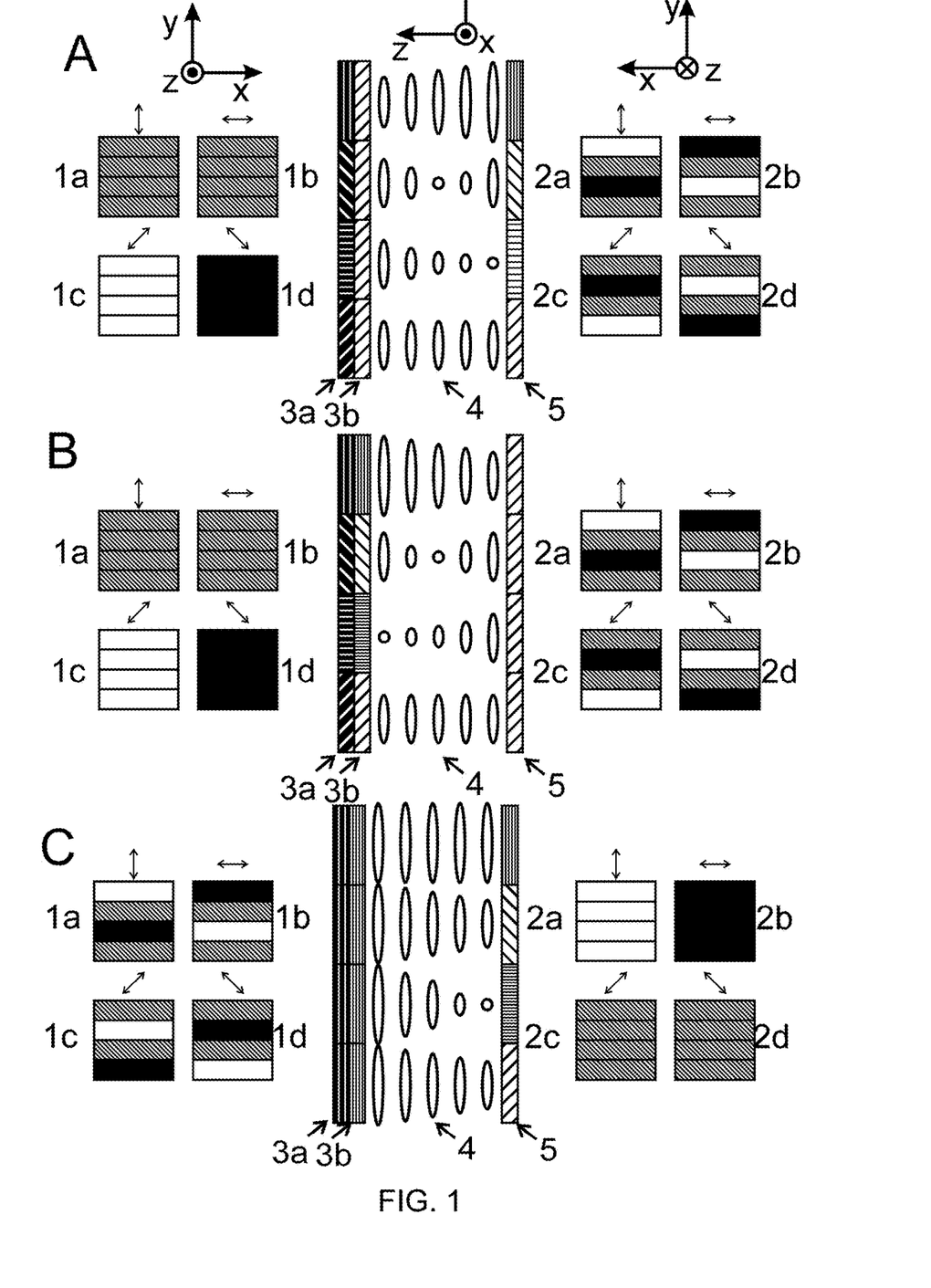
FIG. 1.—shows the structure of the central region of the optical feature with various alignment orientations either for the first structure (group B) and the second one (groups A and C).

FIG. 1 shows the central zone structure of the optical feature according to one of the embodiments of the invention. It contains a PP sheet (3a), an alignment layer (3b), a liquid crystal layer (4) and a second alignment layer (5). 3a and 3b can be just one layer with double function, polarizing and aligning. The alignment layers (3b and 5) can be part of the final device or not.

In each group, A, B and C, of the figure, the device has been divided in four sections with different orientation in one or more layers 3a, 3b and 5 above mentioned. Groups A and B show various orientations of the PP polarization layer (3a) in the x, y plane (0°, 90°, 45° and −45° are used as an example, but in other embodiments of the invention they can be different). Group B shows several orientations of the first alignment layer (3b) in the x, y plane (0°, 90°, 45° and −45° are used as an example, but in other embodiments of the invention they can be different). Groups A and C show several orientations of the second alignment layer (5) in the x, y plane (0°, 90°, 45° and −45° are used as an example, but in other embodiments of the invention they can be different).

In each group of images, the sketches 1a, 1b, 1c and 1d on the left part of the figure and the sketches 2a, 2b, 2c and 2d on the right show the transmitted patterns when it is illuminated with polarized light propagating in positive Z and in negative Z directions respectively, resulting four possible light orientations (0°, 90°, 45° and −45° are used as an example, but in other embodiments of the invention they can be different).

As it can be observed in FIG. 1, the images obtained when the light propagates in opposite directions are totally different. To make it simple, the examples in the figure show four orientations but an arbitrary number of orientations can be defined on each side, obtaining high resolution and quality images which are independent with respect to one another.

Group B in the figure shows one implementation according to one embodiment of the invention wherein the patterned polarizing sheet is made by a color dye which is aligned using a liquid crystal matrix; or it can be made by selective metallization, or micrometric or nanometric grooves, which selectively absorbs and reflect the two orthogonal components of the linear polarization. Liquid crystal molecules directly touching the polarizing sheet (of any type) typically align parallel or perpendicular to the polarization direction transmitted by the PP.

Figure 2:
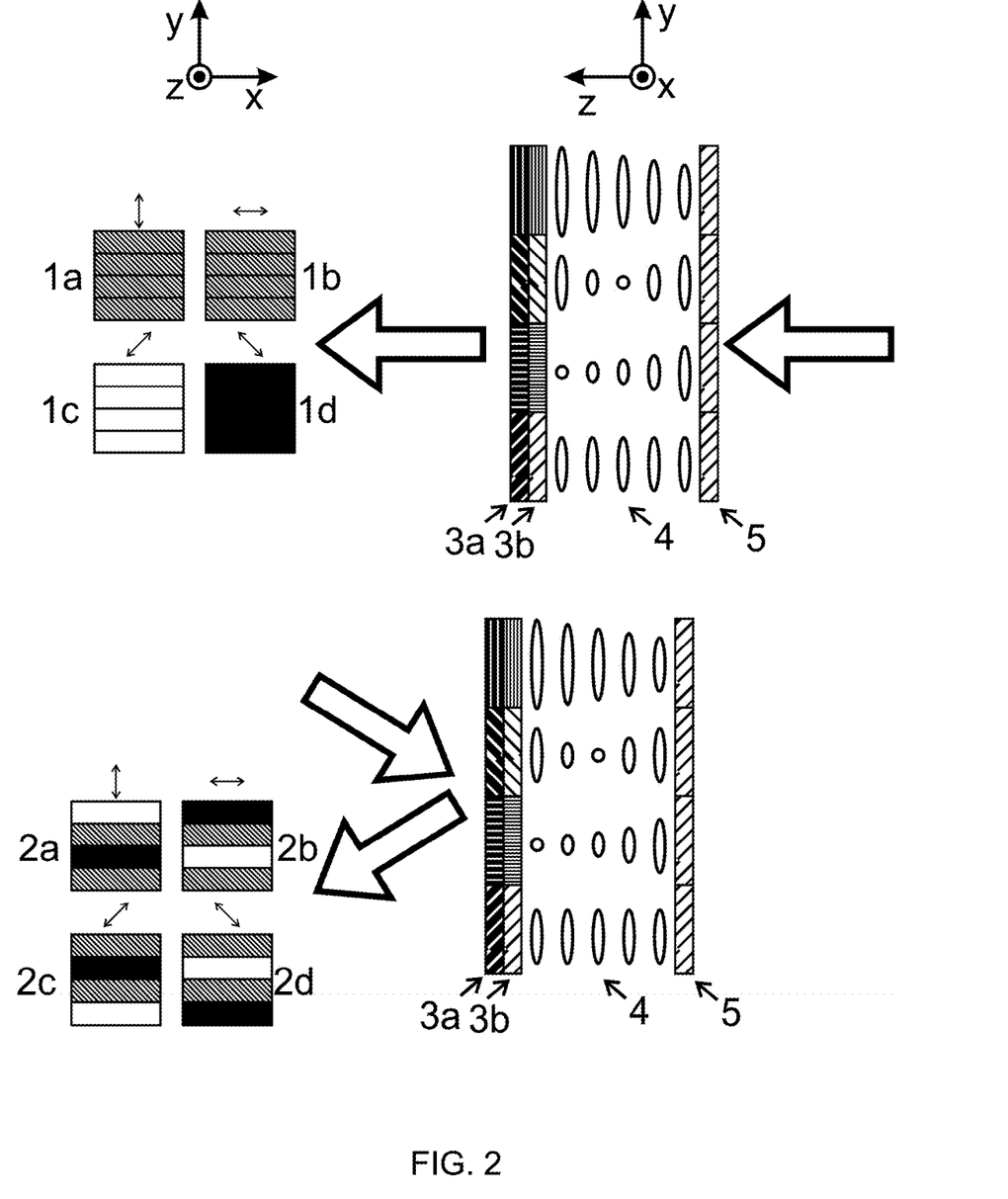
FIG. 2.—shows one embodiment of the present invention either in transmission and reflection wherein the polarizing sheet is reflective.
Figure 3:
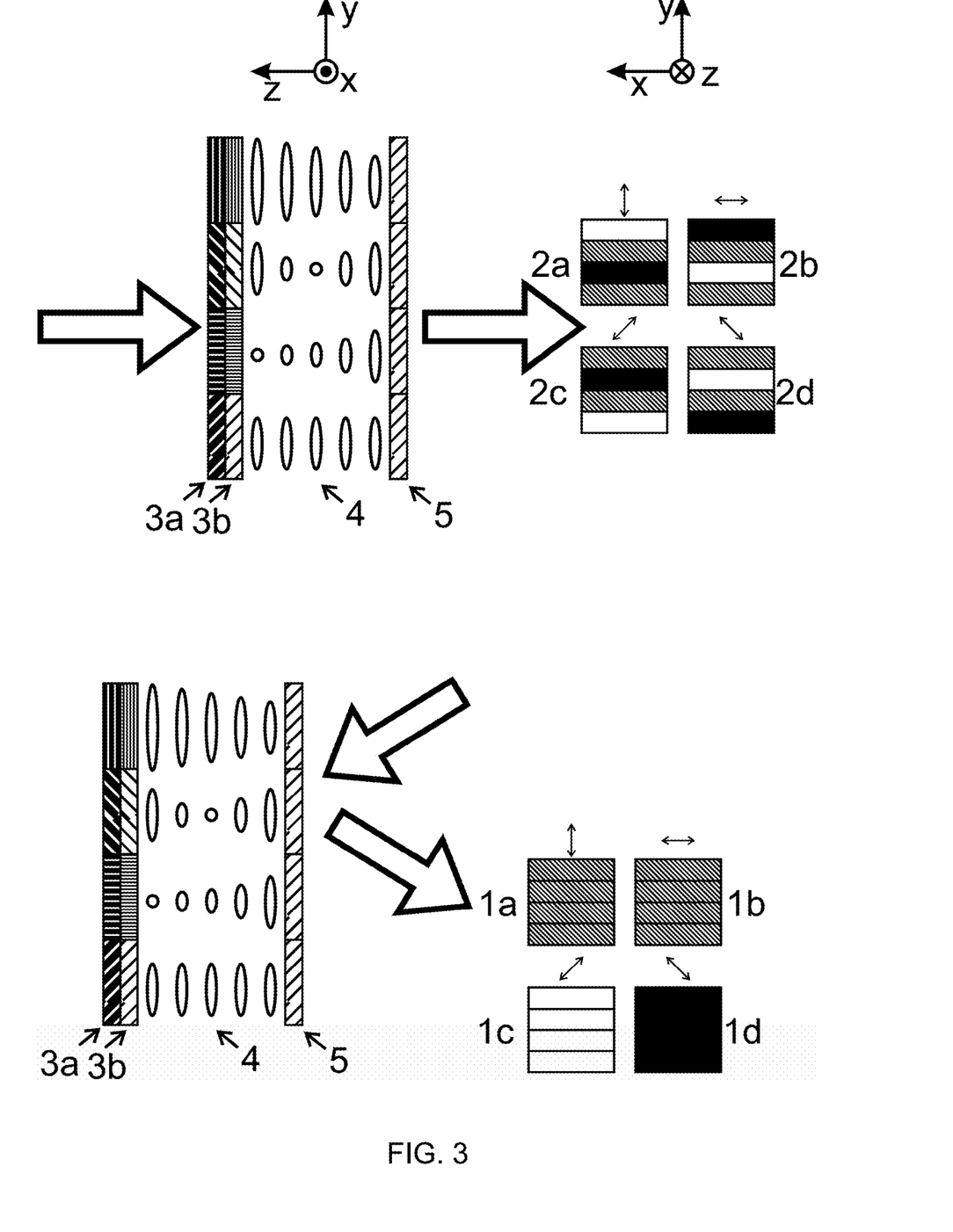
FIG. 3.—shows the same embodiment of FIG. 2, but the results of transmission and reflection of the opposite side.

FIGS. 2 and 3 show an example of the optical feature embodiment for transmission and for reflection when PP reflective sheets are used. The resulting images of FIG. 2 and FIG. 3 are different because the light impinges from opposite sides and the motifs are completely independent as it has been mentioned before.

The reflective polarizer transmits one polarization of light and it reflects the orthogonal one. These two polarizations are usually linear states but they can also be circular or elliptical. Image contrast is basically determined by the level of polarization of the transmitted and reflected light.

Alignment layers configuration in the example is the same as in FIG. 1B; the numbering of the different elements is also the same as in FIG. 1. The image that appears in reflective mode when the sample is observed from positive Z direction is identical to the image that appears in transmissive mode when it is observed from negative Z direction, and vice versa.

Figure 4:
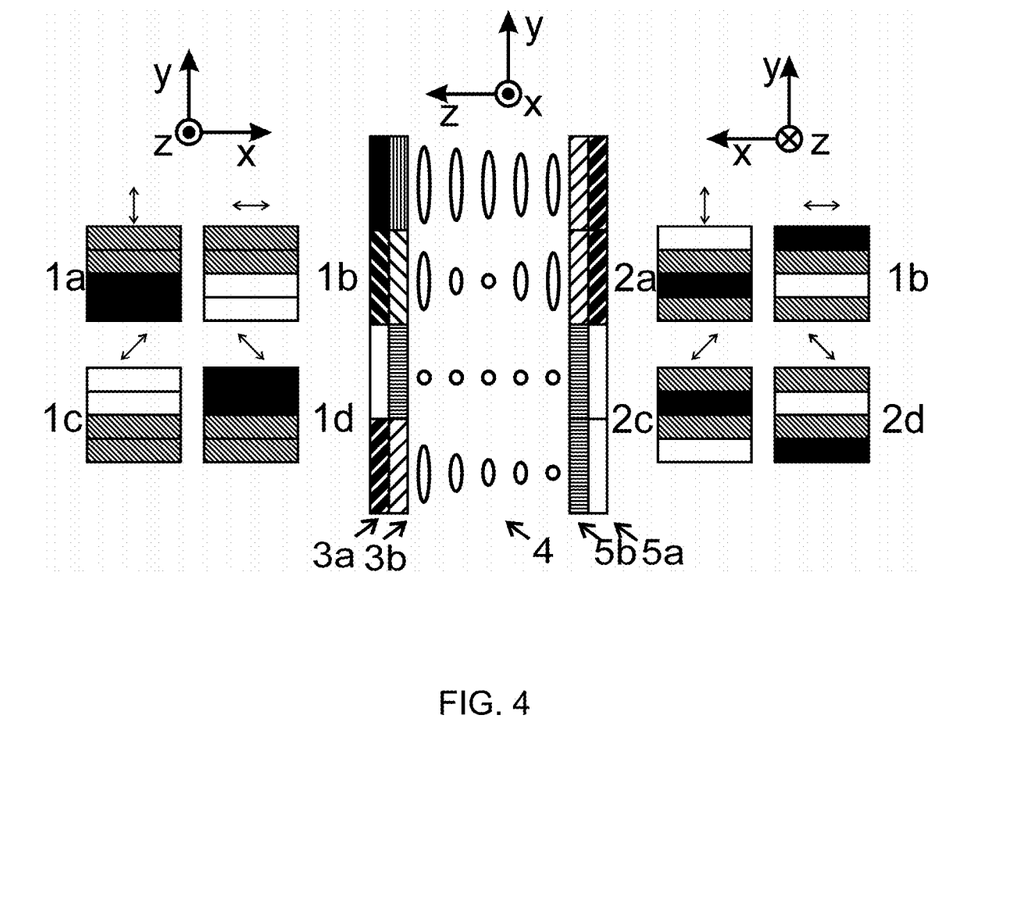
FIG. 4.—shows one embodiment of the invention which includes two polarizer sheets.

FIG. 4 corresponds to one embodiment of the invention which is useful as a descriptive example of the optical element implementation by using two polarizing sheets. The liquid crystal molecules that are directly touching the polarizing sheet are typically aligned parallel or perpendicular to the polarization direction transmitted. In the liquid crystal twist structure, the light that is transmitted through the polarizer close to the source is also transmitted through the polarizer close to the observer. So that two independent images will appear depending on the side observed. It is important that the relation between the alignment directions and the transmitted polarization matches in both alignment surfaces.

The element numbering maintains the same of the other figures, but it is important to emphasize that in the case of the alignment layer (5) it has a dual purpose, as an alignment layer (5b) and as a polarizing sheet (5a).

According to all the abovementioned, the present invention shows advantageously characteristics and technical features compared to the state of art. Principally, the combination of a PP with a twist sheet or a HWP with multiple orientation regions to produce an optical feature for document security application and which does not need dichroic dyes to include multiple latent images. The integration of these two main elements introduces some innovations which allow to convert this effect in a useful product applied in document security. For example:

the creation of a device made-up by a PP and a PLC sheet which jointly achieve that polarized light shows two non-related images in transmission mode;

the PLC sheet with defined images can be produced by using independent confinement plates which are later on combined with the PP. Alternatively, the sheet can be produced directly in contact with the PP so that the polarizer pattern acts as an alignment layer.

It is also possible to obtain the PLC sheet by placing the PLC between two confinement substrates which have the alignment pattern predefined by using any of the technologies previously described. Any confinement structure or both can include the PP.

Gray scale generation which allows to create complex images, by using to alternative methods:

to achieve a B/W image, two orthogonal alignments are promoted on the polarizing sheet and on the selected regions of the PLC confinement plates as it has been described previously.

if a gray scale is required, then multiple orientations are promoted on different regions in the plane of the polarizing sheet of the PLC confinement plates. Those regions can be generated by continuous or discrete non-linear alignments:

Continuous: by continually varying the spatial alignment from −180° to 180°. An example of continuous variation of the alignment is a circular rubbing on one surface, which creates a tangential alignment with respect to the rubbing center.

Discrete: by employing a finite number of alignment directions. For example, simple images with three gray levels can be generated by using alignments tilted 0°, 45° and 90° with respect to the polarization axis of the polarizer. The more number of different alignment angles, the more different gray levels achieved. Another example would be gray scale superimposed images by using mirror alignments with respect to the polarization axis. Two images in each side are achieved this way. The contrast of the images can be improved by employing a quarter wave retarder or a circular polarizer.

False color generation, like in thermal cameras, by using two different methods depending on the structure. Alternatively, it is possible to obtain a true color image by superimposing an RGB color filter matrix to the device.

INDUSTRIAL APPLICATION

The present invention has direct application as a security feature for documents against counterfeiting in banknotes, or authentication of documents, credit cards, bank checks, packaging or any other element whose intrinsic value makes its identification advisable. The verification can be done in transmissive mode by observing under polarized light the clear and dark region pattern created. This pattern depends on the liquid crystal orientation in each spot and on the orientation of the polarization axis of the PP. The devices show at least two images, one on each side. They can be high resolution images, and include gray scale and false intrinsic color (or true color by using a RGB filter external matrix).

The effect is observed by illuminating the device with polarized light which can be the outgoing light from a liquid crystal flat screen, as smartphone, tablet or computer screens. Alternatively, a polarizer can be interposed. In this way, the security feature can be considered as a 1,5 level as it requires an additional element to be verified, but this additional element is commonly used. However, it can be also considered as a level 1 feature as it is not strictly necessary to use a polarizer in order to see the effect: just the use of slightly polarized light like the outgoing flush reflection light from the floor or from a table. This favors the massive implementation as security feature in labels and banknotes, for example.

What is claimed is:

1. A manufacturing method to produce optical features for document security purposes including multiple latent images, comprising:
    a) defining regions on an inner surface of a first confinement and alignment structure;
    b) inducing different alignment directions in the regions defined in step a);
    c) defining a second confinement and alignment structure wherein the second confinement and alignment structure is a polarizer with multiple patterns and defining at least two different regions on an inner surface of the second confinement and alignment structure and inducing different alignment directions on the different regions defined to align the liquid crystal;
    d) placing a liquid crystal between the first confinement and alignment structure and the second confinement and alignment structure;
    e) polymerizing the liquid crystal forming a polymer liquid crystal (PLC) sheet.

2. The method according to claim 1 wherein the induced alignment directions generate a unidirectional common alignment on the inner surface of the multi-patterned polarizer to align the liquid crystal placed between the structures.

3. The method according to claim 2 wherein the definition of the different regions on the inner surfaces of one or both the confinement and alignment structures is selectively carried out by one of the following techniques:

nanometric scale printing;
laser selective ablation;
photolithography;
masks;
physical barriers;
selective deposition;
thermal evaporation;
inkjet;
or a combination thereof.

4. The method according to claim 1 wherein the first confinement and alignment structure also comprises a polarizer with multiple patterns.

5. The method according to claim 1 wherein the induced alignment direction is parallel to the plane of the confinement and alignment structures following an independent pattern for each structure by using one of the following techniques:
mechanical rubbing of the alignment layer;
oblique deposition of the alignment material;
photoalignment of a photosensitive material;
creation of micrometric or sub micrometric structures capable of aligning the liquid crystal;
utilization of interdigitated electrodes generated on the confinement and alignment structures;
or a combination thereof.

6. The method according to claim 1 wherein the alignments induced in the at least two regions are not linear with respect to one another and at least two of the induced alignments are orthogonal with respect to one another, and that further comprises determining the relative angle between the induced alignment to generate different gray levels in the latent image.

7. The method according to claim 1 that further comprises an additional step to add an RGB color matrix to the latent images.

8. The method according to the claim 7 wherein adding an RGB color matrix comprises to set the color matrix so that the regions defined in the sheet match RGB pixels, the RGB matrix being placed on an outer surface of the PLC polymerized sheet or on an outer surface of the patterned polarizer (PP), or on an inner surface of a polymeric protective sheet of the feature.

9. An optical feature for document security purposes with multiple latent images which comprises a polymerized liquid crystal sheet with twist and homogeneous structures combined with a multi-patterned polarizer with various regions comprising alignment directions in a way that the regions maintain their orientation according to an alignment pattern and this orientation differs in an angle less than or equal to 90° in at least one of sides, forming latent images which are visible when illuminating with polarized light, wherein the multi-patterned polarizer is a confinement and alignment structure comprising at least two different regions on its inner surface and different alignment directions on the different regions to align the liquid crystal.

10. The optical feature according to claim 9 that further comprises a polymeric protective film that covers the sheet.

11. The optical feature according to claim 10 that further comprises a RGB matrix placed between the liquid crystal polymerized sheet and the polymeric protective film, or between the polarizer and the polymeric protective film.

12. The optical feature according to claim 9, wherein the alignment directions have relative orientations at 0°, 45°, 90° and 135° to generate two non-overlapping monochrome images on each side of the sheet.

* * * * *